(No Model.)
Z. C. PHILLIPS.
FLUID PRESSURE REGULATOR.
No. 391,644. Patented Oct. 23, 1888.
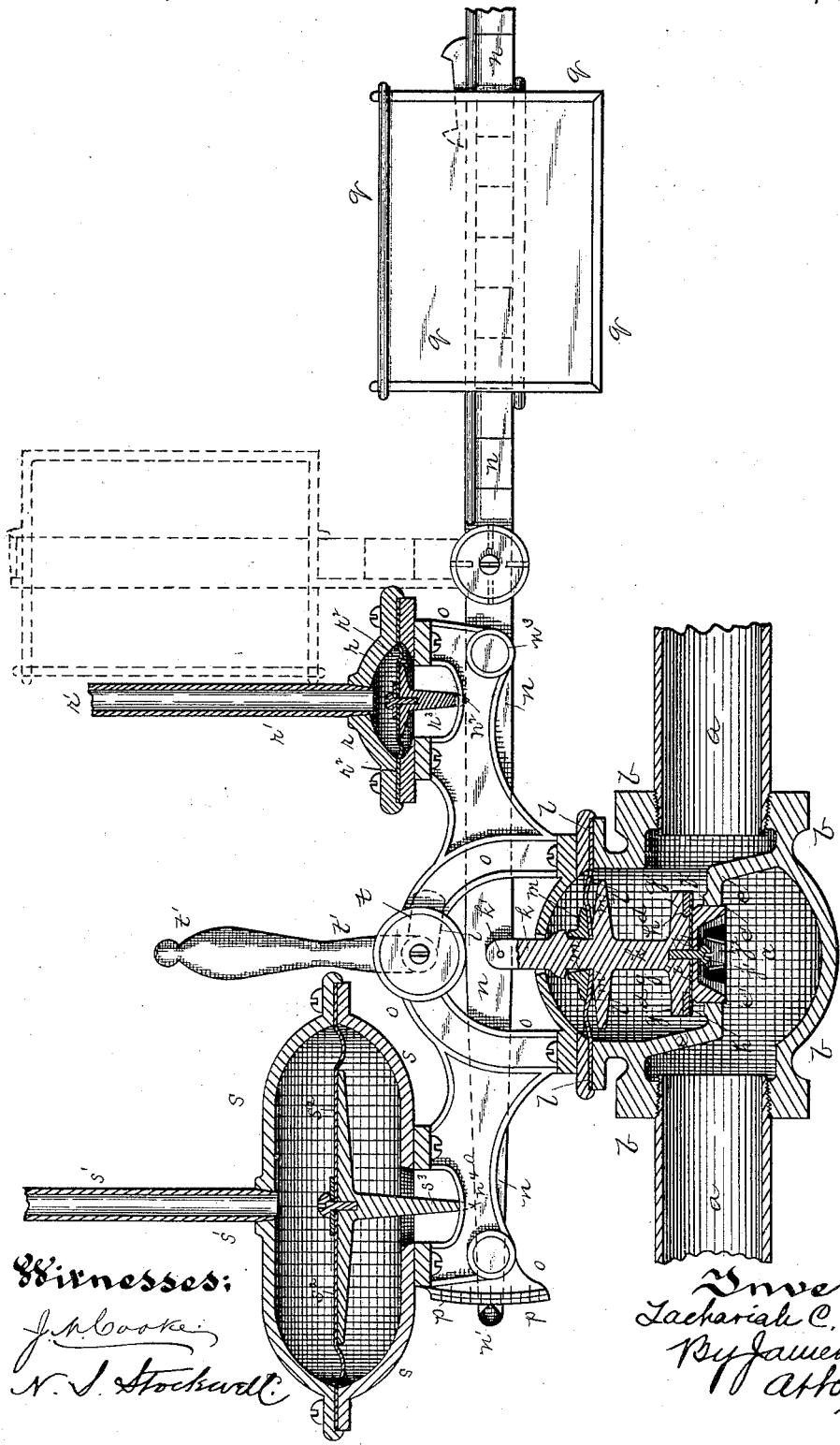

UNITED STATES PATENT OFFICE.

ZACHARIAH C. PHILLIPS, OF ALLEGHENY, PENNSYLVANIA.

FLUID-PRESSURE REGULATOR.

SPECIFICATION forming part of Letters Patent No. 391,644, dated October 23, 1888.

Application filed February 6, 1888. Serial No. 263,083. (No model.)

*To all whom it may concern:*

Be it known that I, ZACHARIAH C. PHILLIPS, a resident of Allegheny, in the county of Allegheny and State of Pennsylvania, have invented a new and useful Improvement in Fluid-Pressure Regulators; and I do hereby declare the following to be a full, clear, and exact description thereof.

My invention relates to fluid-pressure regulators; and it has for its object to provide a regulator which can be used for high or low pressure, and one in which the regulator-valves can be used to cut off the flow of the fluid through the supply-pipe entirely, and also one which can be used in either a vertical or horizontal position.

To these ends my invention consists, generally stated, in a regulator-valve, a balance-beam attached thereto, a high-pressure diaphragm bearing against said beam between the regulator-valve and the fulcrum of the beam, and a low-pressure diaphragm bearing against said beam beyond the valve-connection therewith; and the invention also consists in a regulating-valve, and a balance-beam to which said valve is attached, said beam being hinged at a point beyond its fulcrum, so that the portion containing the poise can be placed at right angles to the main portion of the beam, so as to make the beam operative when the device stands in a vertical position; and the invention also consists in combining with said beam a rigidly-mounted cam or other suitable device to bear on the beam and force the regulating-valve to its seat to close the passage for the fluid when desired; and the invention also consists in certain other improvements, all of which will be more fully hereinafter set forth.

To enable others skilled in the art to make and use my invention, I will describe the same more fully, referring to the accompanying drawing, which shows a side view, partly in section, of my improved apparatus.

Like letters refer to like parts.

In practicing my invention the supply and delivery sections of the pipe $a$ are separated by a valve-casing, $b$, which is divided into the two chambers $c$ and $d$ by a diagonal partition, $e$, which partition is provided with the opening or passage $e'$ therein for the passage of the fluid therethrough. The upper face, $f$, of the rim of this passage $e'$ is dressed off to form a seat for a valve, $g$, which rests thereon when the valve is closed. For the purpose of providing a yielding face to this valve which will not be cut and worn by the fluid passing through the passage $e'$, I prefer to place around an annular face, $g'$, on the body of the valve an annular gasket or washer, $h$, which is made of some yielding or pliable material—such as rubber—and over this gasket or washer to place a disk, $i$, of hard sheet metal, which disk is held to the valve $g$ by a washer, $f'$, and set-screw $j$. This combination has the advantage that when the valve is force to its seat, as hereinafter explained, a yielding surface is provided on the valve, so that it may tightly fit said seat and take up any excessive pressure applied to close the valve, while at the same time a hard wearing-surface is presented to the valve-seat which is not easily affected by the fluid passing through the valve or wears to any extent by use. For the purpose of guiding the movement of the valve on its seat, the washer $j$ may have a number of lugs, $j^2$, thereon, which bear against the rim of the openings $c'$ and keep the valve in its proper position. The valve $g$ is provided with the stem $k$, which extends up through the casing and passes through a diaphragm, $l$, which is secured to the upper edge of said casing, and serves to prevent the escape of the fluid from the chamber $d$, and at the same time permitting the movement of the valve-stem without any friction, the latter being secured to the diaphragm by suitable washers or disks, $m\ m'$, above and below the same.

Attached to the upper edge of the valve-casing $b$ is a bifurcated or two-part frame, $o$, extending out on each side of its support on the casing and having fulcrumed between its parts near one end a balance-beam, $n$, to which the valve-stem $k$ is preferably attached directly over the valve-seat. The beam extends beyond its point of attachment to the valve-stem $k$ and carries at its end a pointer, $n'$, which serves to indicate the amount of movement of the beam, and thus of the valve, by traveling over a scale, $p$, formed on the end of the frame $o$. The other end of this beam $n$ extends beyond its fulcrum and carries the sliding poise or balance-weight $q$. To avoid the necessity of having a number of weights for different pressures, I make the poise in the form of a box or receptacle, in which scrap, shot, or any other suitable material may be placed to counterpoise the pressure desired. As in some cases it may be necessary to place the apparatus in a vertical position, I make the projecting end of this balance-beam $n$ hinged to the main portion thereof, just beyond the fulcrum $n^3$, so that the end carrying the poise may be turned at right angles to the main portion of the beam, as indicated in dotted lines on the drawing, and thus the effect of the counterpoise on the beam obtained when the apparatus is so placed. In order to hold the beam in this position, any suitable device may be employed; but the means preferred by me consists in making the beam in two parts which lap over each other at their meeting-point and are held together by a screw, $u$, one of the parts having recesses therein, which are engaged by lugs on the other part, which serves to hold the parts in whatever position may be desired.

Mounted on the frame $o$ between the fulcrum $n^3$ of the beam $n$ and its connection with the valve-stem $k$ is a chamber, $r$, having a supply-pipe, $r'$, leading from the delivery-pipe or other suitable point, the lower part of said chamber being closed by a diaphragm, $r^2$, to which is attached a center point, $r^3$, that bears at its lower end against a countersunk seat, $n^2$, in the edge of the beam $n$, so that as the diaphragm $r^2$ is affected by the pressure thereon its movement is transmitted to the beam by this center point, and thus to the regulating-valve $g$. As this diaphragm is intended to be employed with high pressures, it is made comparatively small in area. Where low pressures are to be employed with the apparatus, a similar but larger chamber, $s$, is secured to the frame $o$ beyond the point of attachment $k'$ of the valve-stem $k$ with the beam $m$, this chamber having a supply-pipe, $s'$, leading therein and being closed by a diaphragm, $s^2$, to which a center point, $s^3$, is attached that bears at its lower end against the beam $n$ in a countersunk seat, $n^2$, therein.

In order to completely turn off the fluid-pressure passing through this pipe without the necessity of having any other valve than the regulating-valve $g$, I mount in the frame $o$, immediately over the connection $k'$ of the valve-stem $k$ to the beam $n$, a cam, $t$, which is provided with an operating-handle, $t'$, that serves to turn the cam or other suitable device down on the edge of the beam $n$ and force the valve $g$ on its seat in the casing $b$, cutting off all passage for the fluid.

The operation of the regulator is as follows: The pressure being on one or the other diaphragms, $r^2$ or $s^2$, and the poise loaded to the pressure desired, as long as the pressure on the diaphragm $r^2$ or $s^2$ is equal to the weight of the poise $q'$ the beam $n$ is held with the pointer $n'$ at the middle mark on the scale $p$, and the valve $g$ half open; but if the pressure on the diaphragm $r^2$ or $s^2$ becomes greater than that of the poise $q$ the center point, $r^3$ or $s^3$, is forced downward, and with it the beam, which causes the valve $n$ to close down more on its seat, permitting a smaller amount of fluid to pass to the delivery-section of the pipe $a$. If the pressure on the diaphragm $r^2$ or $s^2$ falls below that of the poise $q$, then the poise causes the beam $n$ to raise the valve $g$ to permit a larger amount of fluid to pass through the opening $e'$; so on, the varying in pressure causing a disturbance in the equilibrium between the poise $q$ and the pressure on the diaphragm $r^2$ or $s^2$, which immediately affects the valve $g$ and corrects the difficulty. When it is desired to run on high pressures, the diaphragm $r^2$ is in communication, and when low pressure the diaphragm $s^2$.

My improved regulator has the advantages that it is applicable to either high or low pressures, is very simple in construction, and is composed of such parts that very little machine-work is required in its construction.

Having now described my invention, what I claim is—

1. In a pressure-regulator, the combination of a balance-beam, a regulating-valve connected thereto, a small pressure-diaphragm bearing against said beam between its fulcrum and the point of connection with the regulating-valve, and a larger pressure-diaphragm bearing against the beam beyond its connection with the regulating-valve, substantially as and for the purpose set forth.

2. In a pressure-regulator, the combination, with the valve-casing, of the bifurcated frame mounted thereon, having a scale formed on one end, a balance-beam fulcrumed to the opposite end of said frame and carrying a pointer on one end, which travels over said scale, and a regulating-valve connected to said beam, substantially as and for the purpose set forth.

3. In a pressure-regulator, the combination, with a regulating-valve, of a balance-beam connected therewith and having its outer end hinged to the main portion of the beam, said beam being divided into two parts, hinged together and adapted to be secured either in line with or at an angle with each other, substantially as and for the purpose set forth.

4. In a pressure-regulator, the combination of a frame, a balance-beam fulcrumed to said frame, a regulating-valve connected to said beam, and a device mounted on said frame for forcing said beam down and the valve to its seat, substantially as and for the purpose set forth.

5. The combination of the valve-casing $b$, having the opening $e'$ therein, a valve, $g$, for closing said opening, a balance-beam, $n$, to which said valve is attached, and a cam, $t$, bearing against the beam for forcing said beam and valve inward and holding said valve to its seat, substantially as and for the purpose set forth.

In testimony whereof I, the said ZACHARIAH C. PHILLIPS, have hereunto set my hand.

ZACHARIAH C. PHILLIPS.

Witnesses:
JAMES I. KAY,
J. N. COOKE.